United States Patent [19]
Molnar et al.

[11] Patent Number: 5,734,597
[45] Date of Patent: Mar. 31, 1998

[54] GRAPHICAL USER INTERFACE INTERACTION BETWEEN TIME AND DATE CONTROLS

[75] Inventors: Mark John Molnar, Georgetown, Tex.; Darlene Margaret Ross, Milton, Vt.

[73] Assignee: International Business Machines Corporation, Armonk, N.Y.

[21] Appl. No.: 561,743

[22] Filed: Nov. 24, 1995

[51] Int. Cl.$^6$ ........................................ G06F 3/00
[52] U.S. Cl. .................. 364/705.08; 395/963; 395/352
[58] Field of Search ........................... 395/326–358, 395/970, 963; 364/705.07, 705.08; 345/145–146, 117–120, 326–358, 970, 963

[56] References Cited

U.S. PATENT DOCUMENTS

| | | | |
|---|---|---|---|
| 4,600,918 | 7/1986 | Belisomi et al. | 364/705.08 X |
| 4,823,283 | 4/1989 | Diehm et al. | 395/352 |
| 5,050,105 | 9/1991 | Peters | 364/521 |
| 5,181,273 | 1/1993 | Ohtani | 345/156 |
| 5,247,284 | 9/1993 | Fleming | 345/156 |
| 5,289,205 | 2/1994 | Torres | 345/124 |
| 5,375,199 | 12/1994 | Harrow et al. | 395/159 |
| 5,396,305 | 3/1995 | Egawa | 354/76 |
| 5,418,549 | 5/1995 | Anderson et al. | 345/145 |
| 5,428,736 | 6/1995 | Kahl et al. | 395/349 |
| 5,487,144 | 1/1996 | Takahashi et al. | 395/349 |
| 5,544,078 | 8/1996 | Podkowa | 364/705.08 X |
| 5,548,345 | 8/1996 | Brian et al. | 345/146 |
| 5,602,997 | 2/1997 | Carpenter et al. | 395/349 |

OTHER PUBLICATIONS

Microsoft Windows User's Guide v3.0, Microsoft Corp., pp. 180–189, 1990.
Foley et al., "Computer Graphics: Principles and Practice", 2nd ed., Addison–Wesley Pub. Co., pp. 435–451, Nov. 1993.
Advanced Interface Design Guide, IBM Corp., pp. 70–73, Jun. 1989.
Digital Guide to Developing International Software, Cynthia Hartman Kennelly, 1991 Digital Equipment Corporation, pp. 133–139.

*Primary Examiner*—John E. Breene
*Attorney, Agent, or Firm*—Jeffrey S. LaBaw

[57] ABSTRACT

An object oriented date and time control in a graphical user interface of a computer system is composed of a plurality of child objects, e.g., spin buttons. Changes to the children of the control are consolidated in a massaging mechanism which includes a message format including a control identifier of the control and a name of the detected change. In this way, the owning application does not have to monitor element of the control separately. Each child object has a range of allowed values which the user may select. The child objects interact such that a range of allowed values in one child object, the child object which sets the day value, is set according to the value for another child object, the child object which sets the month value. Responsive to changes in the month value, the range of allowed values for the day value may change accordingly. The date and time control is sensitive to locale or country specific data. In response to a given locale for the owning application, the order of the day, month and year elements of the date control and the 12 hour or 24 hour modes of the time control may be set compatibility to the conventions of the given locale.

24 Claims, 9 Drawing Sheets

GRAPHICAL USER INTERFACE INTERACTION BETWEEN TIME AND DATE CONTROLS

BACKGROUND OF THE INVENTION

The present invention relates generally to graphical computer interfaces. More particularly, the invention relates to date and time controls in a graphical user interface allowing user input time and date values to be transmitted to an application program.

As users of computers have continued to transition from highly skilled computer programmers to people from all levels of society, including those with relatively low skill levels, it has become necessary to improve the usability of a computer. Among the means employed to make a computer more "user friendly" is a graphical user interface or "GUI". As compared to command line interfaces wherein end users must memorize complex and convoluted commands and command syntax to perform a given function, a GUI provides manipulable graphical objects such as windows, icons and various controls on the display screen. These graphical objects can be used in a more intuitive manner to control the operation of the computer system. Well known graphical user interfaces include IBM's OS/2™ Operating System, the user of various operating systems for the computers made by the Apple Corporation and Microsoft Windows™.

The controls used in many known graphical user interfaces (GUIs) are object based. That is, the window controls in a particular dialog window are child objects of the window. Examples of controls which allow the user to interact with an application are entry fields, radio buttons, checkboxes, and spin buttons. In OS/2, the Presentation Manager (PM) facility has provided these and many other standard controls as graphical objects which developers can use to build a GUI for their applications. Presentation Manager is the underlying presentation interface in the OS/2 environment for providing GUI related controls. Motif is the equivalent presentation interface in the AIX environment. Typically, any GUI related classes developed in the given environment build on top of this underlying presentation interface to provide in additional level of encapsulation from the presentation interface, while providing additional function and ease of application development. The Workplace Shell Programming Interface is one example specific to the OS/2 environment of an object class hierarchy that encapsulates some features of Presentation Manager. The Workplace Shell Programming Interface was developed in order to create the OS/2 Workplace Shell itself and is not available to be used independently from the OS/2 operating system. However, some of its classes can be used to develop applications in the OS/2 environment. Other object class libraries, such as IBm Open Class Library, provide GUI related control classes which are designed to interface with multiple underlying presentation interfaces; hence, applications developed using these classes can be easily ported to any of the environments which the class library supports. However, many applications need two controls which are not part of the libraries available to the OS/2 developer: Date and time controls. Currently, whenever an application has a need to display a date or time value in such a way that the user can change it, i.e. not just an output only field, the developer must construct these fields from other controls and provide all of the necessary functionality. For example, a user must not be allowed to enter dates that are not valid such as February 30, or times that are not valid such as entering 25 hours in a day. Further, there are many national language issues to be addressed when dealing with date and time, if an application will be internationally marketed. These and many other considerations must be taken into account by every developer that needs to provide a date or a time field as part of a GUI. Hence, a need clearly exists for controls which provide all of these features.

SUMMARY OF THE INVENTION

Therefore, it is an object of the invention to provide an improved graphical user interface for inputting date and time data.

It is another object of the invention to limit entry of inaccurate date and time data.

It is another object of the invention to reuse the controls for a variety of platforms with minimal recording effort.

It is another object of the invention to support internationalization issues specific to particular countries.

These and other objects are accomplished by a date and time control in a graphical user interface of a computer system, the control composed of a plurality of child elements, e.g., spin buttons. User input to the child elements is monitored. If a change is detected a message including a control identifier of the control and a name of the detected change is prepared to the application which owns the control. In this way, the owning application does not have to monitor elements of the control separately.

The control is preferably an object oriented control composed of plurality of child objects. Each object has a range of allowed values which the user may select. The child objects interact such that a range of allowed values in one child object, the child object which sets the day value, is set according to the value for another child object, the child object which sets the month value. Responsive to changes in the month value, the range of allowed values for the day value may change accordingly.

The date and time control is sensitive to locale or country specific data. In response to a given locale for the owning application, the order of the day, month and year elements of the date control and the 12 hour or 24 hour modes of the time control may be set compatibility to the conventions of the given locale. The application may override the standard conventions through a programming interface of the control if deemed inappropriate for a particular application.

BRIEF DESCRIPTION OF THE DRAWINGS

These objects, features and advantages will be more readily understood with reference to the attached figures and following description.

DETAILED DESCRIPTION OF THE PREFERRED EMBODIMENT

The invention my be run on a variety of computers or collection of computers under a number of different operating systems. The computer could be, for example, a personal computer, a mini computer, mainframe computer or a computer running in a distributed network of other computers. Although the specific choice of computer is limited only by disk and disk storage requirements, computers in the IBM PS/2 (TM) series of computers could be used in the present invention. For additional information on IBM's PS/2 series of computers, the reader is referred to *Technical Reference Manual Personal* Systems/2 Model 50, 60 Systems IBM Corporation, Part No. 68X2224 Order Number S68X-2224 and *Technical Reference 2 Manual Personal Systems/2 Model 80) IBM Corporation* Part No. 68X 2256 Order Number S68X-2254. One operating system which an IBM PS/2 personal computer may run is IBM's OS/2 2.0 (TM) for more information on the IBM OS/2 2.0 Operating System the reader is referred to *OS/2 2.0 Technical Library, Programming Guide Vol.* 1, 2, 3 *Version* 2.00 Order Nos. 10G6261, 10G6495, 10G6494.

In the alternative, the computer system might be in the IBM RISC System/6000 (TM) line of computers which run on the AIX (TM) operating system. The various models of the RISC System/6000 is described in many publications of the IBM Corporation for example, *RISC System/6000, 7073 and 7016 POWERstation and POWERserver Hardware Technical* reference, Order No. SA23-2644-00. The AIX operating system is described in *General Concepts and Procedure*—AIX Version 3 for RISC System/6000 Order No. SC23-2202-00 as well as other publications of the IBM Corporation.

Figure 1:
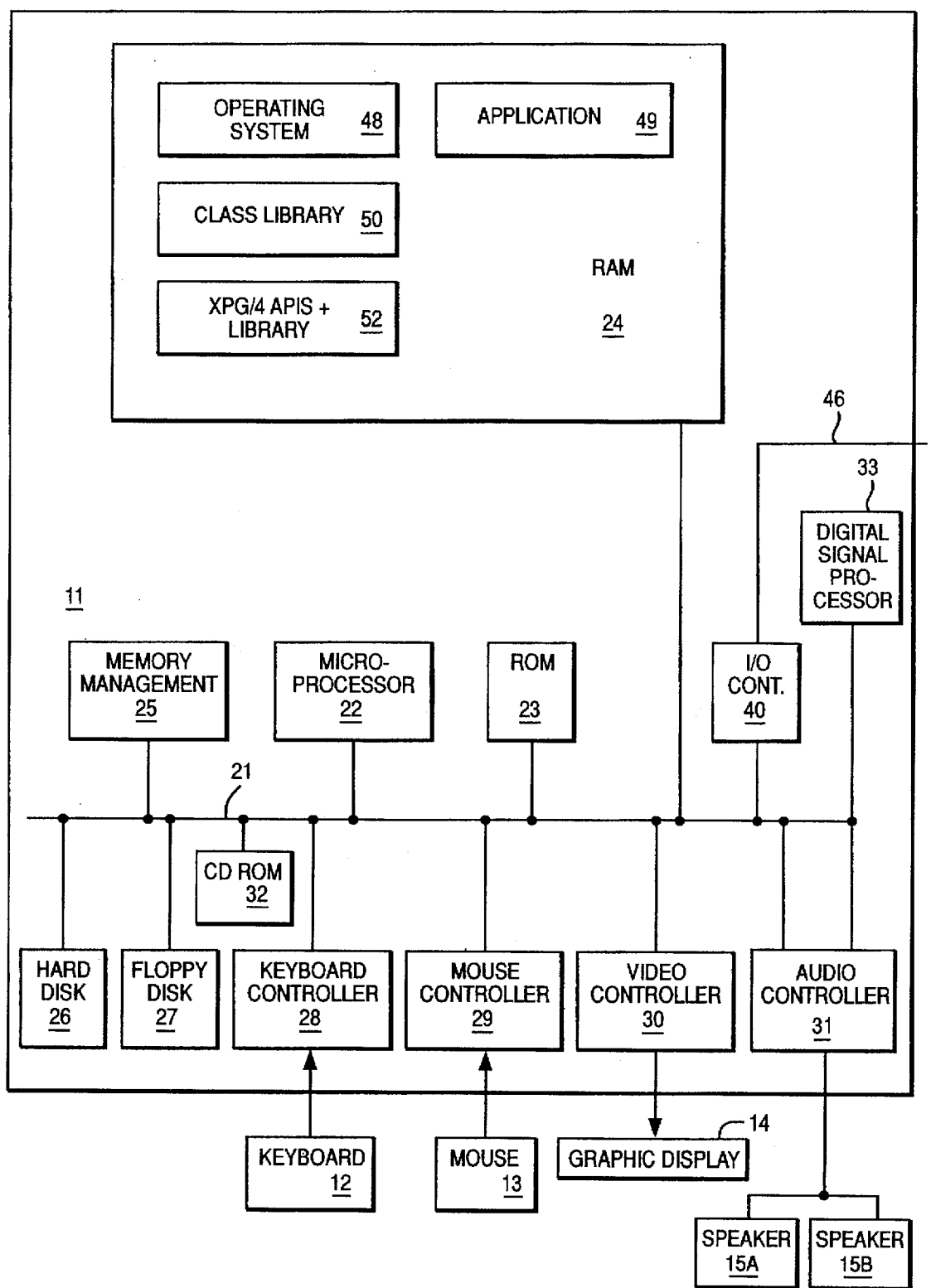
FIG. 1 depicts a computer system configured according to the teachings of the present invention.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM compatible computers is one of the Intel family of microprocessors including the 386, 486 or Pentium (TM) microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM, or others by Hewlett Packard, Sun, Motorola may be used in the specific computer.

The ROM 23 contains among other code the Basic Input-Output system (BIOS) which controls basic hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40 such as a Token Ring Adapter enables communication over a network 46 to other similarly configured data processing systems.

One of the preferred implementations of the invention is as sets of instructions 48–52 resident in the random access memory 24 of one or more computer systems configured generally as described above. Until required by the computer system, the set of instructions may be stored in another computer memory, for example, in the hard disk drive 26, or in a removable memory such as an optical disk for eventual use in the CD-ROM 32 or in a floppy disk for eventual use in the floppy disk drive 27. One skilled in the art would appreciate that the physical storage of the sets of instructions physically changes the medium upon which it is stored electrically, magnetically, or chemically so that the medium carries computer readable information.

While it is convenient to describe the invention in terms of instructions, symbols, characters, or the like, the reader should remember that all of these and similar terms should be associated with the appropriate physical elements. Further, the invention is often described in terms of selecting or validating, or other terms that could be associated with a human operator. No action by a human operator is desirable in any of the operations described herein which form part of the present invention; the operations are machine operations processing electrical signals to generate other electrical signals.

The GUI Time and Date controls of the present invention are preferably implemented as C++ classes using the IBM Open Class Libraries, so that they can be reused on multiple platforms such as OS/2, AIX, and any future platforms that the Open Class Libraries support. Additionally, the controls are designed to fully support internationalization through the use of XPG/4 compliant APIs. The User Interface Class Library is one of the libraries included in the IBM Open Class library. This is a publicly available offering from IBM. It is currently available as part of the IBM VisualAge C++ for OS/2 3.0 product. The classes contained in this library are documented in the following publication: IBM VisualAge C++ for OS/2 3.0 Open Class Library Reference, Vols. 1–3 Order Nos. S25H-6965-00, S25H-6966-00, and S25H-7031-00. The present invention is contemplated for inclusion in a class library or other GUI building tool so that application developers may utilize it in their applications.

Figure 2:
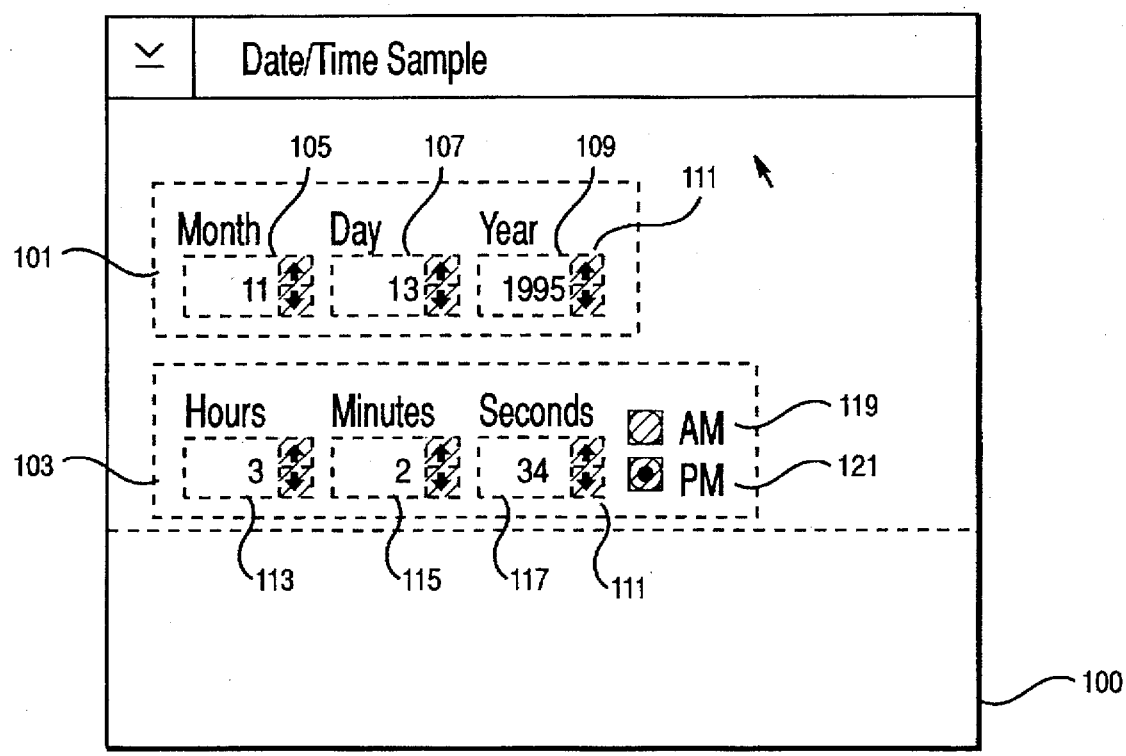
FIG. 2 depicts one preferred graphical interface according to the teachings of the present invention.

As shown in FIG. 2, window 100 contains both date control 101 and time control 103. The date control consists of three spin buttons 105, 107, 109, each with its own spin button arrows 111 so that users can easily adjust the values. The month spin button 105 will only accept values 1–12. The day spin button 107 will accept only those values that are accurate for each given month. For example, if the month spin button 103 is currently set to 2(February), the day spin button 107 will not accept values higher than 28, if it is not a leap year. If the year spin button 109 is set to a year that is a leap year, the day spin button 107 will allow 29 days in February. The year spin button 109 accepts any values from 0–9999. Four digits were used because of the imminent turn of the century. Above each spin button, the appropriate language equivalent of "Month", "Day", and "Year" labels will indicate what each spin button represents. One skilled in the art would appreciate that other controls such as empty fields or drop down selection fields might be used as components for other controls. These values are fully translatable.

The order of spin buttons will be determined by the appropriate language locale. In the preferred embodiment, the appropriate language locale is supported compatibly to the XPG/4 standard for internationalization APIs. The XPG/4 standard is an X/Open standard and is documented in XPG/4 CAE Specification a publication of the X/Open which is hereby incorporated by reference. For example, some countries prefer dates to be expressed in a Day, Month, Year sequence, or a Year, Month, Day sequence, rather than the English American format, Month, Day, Year. These variations will all be supported automatically based on locale, and additionally, can be set through a public interface to the control. In the preferred embodiment, the date order is set at initialization of the control, based on locale information if available. In the absence of locale information, the date order defaults to Month, Day, Year. However, a public programming interface is provided, such that the date order can be set programmatically to any of the three date formats. This allows the application greater flexibility in the event that the format dictated by the locale is not appropriate for the current application or locale information does not exist on a given system.

Other public interfaces of this new date control class as explained below include the ability to programmatically set the control to any valid date, the ability to retrieve the current value of the date from the control, the ability to format the value of the date into a culturally correct string, i.e. /mm/dd/yy, and the ability to enable and disable the control as a single entity.

The time control 103 also consists of three spin buttons 113, 115, 117 each with its own spin button arrows 111 so that users can easily adjust the values. This control 103 supports both 24 and 12-Hour time formats. In a preferred embodiment, the format defaults automatically to the appropriate format based on the appropriate language locale as supported by the XPG 4 internationalization APIs. Additionally, as explained below, the time format (24 vs. 12) can be set programmatically through a public interface to the class. If 24-Hour format is desired, the hour spin button will accept values from 0–23. If 12-Hour format is desired, the hour spin button will accept values from 1–12. In the 12-Hour format, two radio buttons are provided which allow selection of AM or PM. Similar to the date control 101 described above, above each spin button the appropriate language equivalent of Hours, Minutes, and Seconds labels will indicate what each spin button represents. All values, including the AM and PM strings, are fully translatable.

Language translation of software typically involves a two step process. First, the software itself is "enabled" for translation, which means that all text strings needed by the application are stored (typically in a file) externally to the application. These files typically have each text string identified by a non-translatable label with which the application references the text string. Second, the files containing the text strings are sent to a translation center where languages translators translate each text string (which in the US is in English) into the appropriate languages in which the software will be supported.

As mentioned above, an object based approach is the preferred embodiment of the invention. IBM System Object Model (SOM), the Workplace Shell Programming Interface, and IBM Open Class are all examples of object oriented class hierarchies from which graphical user interfaces can be developed. The IBM Open Class Library, a collection of C++ class libraries, allows for a child object to "inherit" the methods of a parent object. This is true of many object based systems. In C++, multiple inheritance is possible; that is, a child object can be derived from multiple parents, inheriting methods from multiple parent objects. The undesired methods in the parent objects can be overridden in derivation process creating the child object. In addition, a child class can define new methods of its own. The process of creating a new child class from a parent class is also called class derivation or subclassing. All of these procedures are well known to those skilled in object oriented programming.

The IBM Open Class Library consists of several C++ class libraries which can be used in developing applications. Some of the classes contained in these class libraries can be modified to provide some of the function of the present invention. Alternatively, those skilled in the art can build their own objects from scratch with the methods described below. In the preferred embodiment, IMultiCellCanvas class of the User Interface Class Library was chosen as a parent class for both the date and time controls. This parent class, IMultiCellCanvas, provides many of the features helpful in creating date and time controls. One of the most attractive features of the multicellcanvas is the ability to provide a "canvas" which can be divided into cells, such that the components of the controls can be nicely formatted into rows and columns. Another feature of the multicellcanvas is the ability to automatically resize all of its child windows proportionally whenever the canvas is resized. This property is not essential for the invention; one skilled in the art would appreciate that an automatic resize method can be added to the spin button object or the spin button object may not be capable of being resized.

Since the spin button objects have no inherent relationship to each other even within a single canvas object, a series of methods were developed to control the values of the spin buttons such that unrealistic values would not be displayed. The User Interface Class Library provides general purpose spin and edit handler objects which can be subclassed for this purpose. A spin handler, for example, can be attached to a spin button, such that whenever a change to the spin button occurs, a method is invoked giving the application a chance to inspect and manipulate the values appropriately.

In the preferred embodiment of the invention, a new spin handler class was created by subclassing an existing spin handler class available in the User Interface Class Library. This parent class, ISpinHandler, allows methods to be invoked whenever a spin button is incremented or decremented. In the absence of the preferred embodiment, one skilled in the art could provide this functionality from scratch, however, the new spin handler class created for purposes of this invention should provide for the following conditions as detailed in FIGS. 3A–D and described below.

Figure 3A:
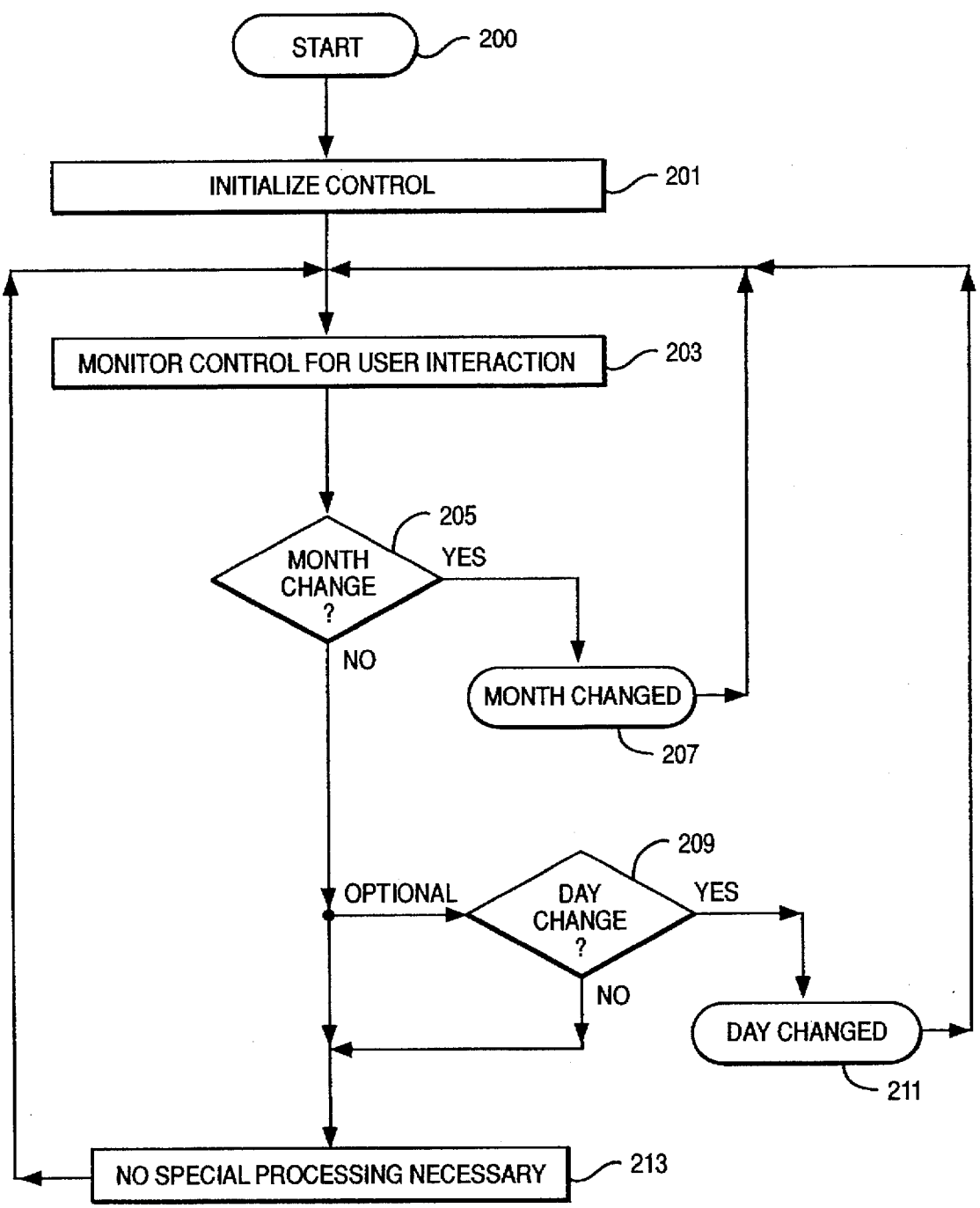
FIGS. 3 A–D are flow diagrams of controlling user input into the date control so that only valid data information is accepted.

Referring now to FIG. 3A, the process starts, step 200. In step 201, the control is initialized according to the standard practices for object creation in the given object system, in this case C++ via the class constructor. In step 203, the control is monitored for user interaction by means of a monitoring method. That is, when a user pushes one of the arrows of a given spin button, the event causes a method to be invoked. If desired, upon receipt of an event, the application developer may elect to invoke additional processing. Presuming this is true, in step 205, a test is performed to determine whether the month spin button was changed. If the month spin button is changed, a new method should be invoked, MonthChanged, illustrated here as step 207 and in greater detail in FIG. 3B. Next, in step 209, a test determines whether the day spin button is changed. If so, the DayChanged method is invoked in step 211, illustrated greater detail in FIG. 3C. In the case of a change to the year spin button, the preferred embodiment concludes that no special processing is necessary, step 213, and returns to monitoring the control for user interaction.

Figure 3B:
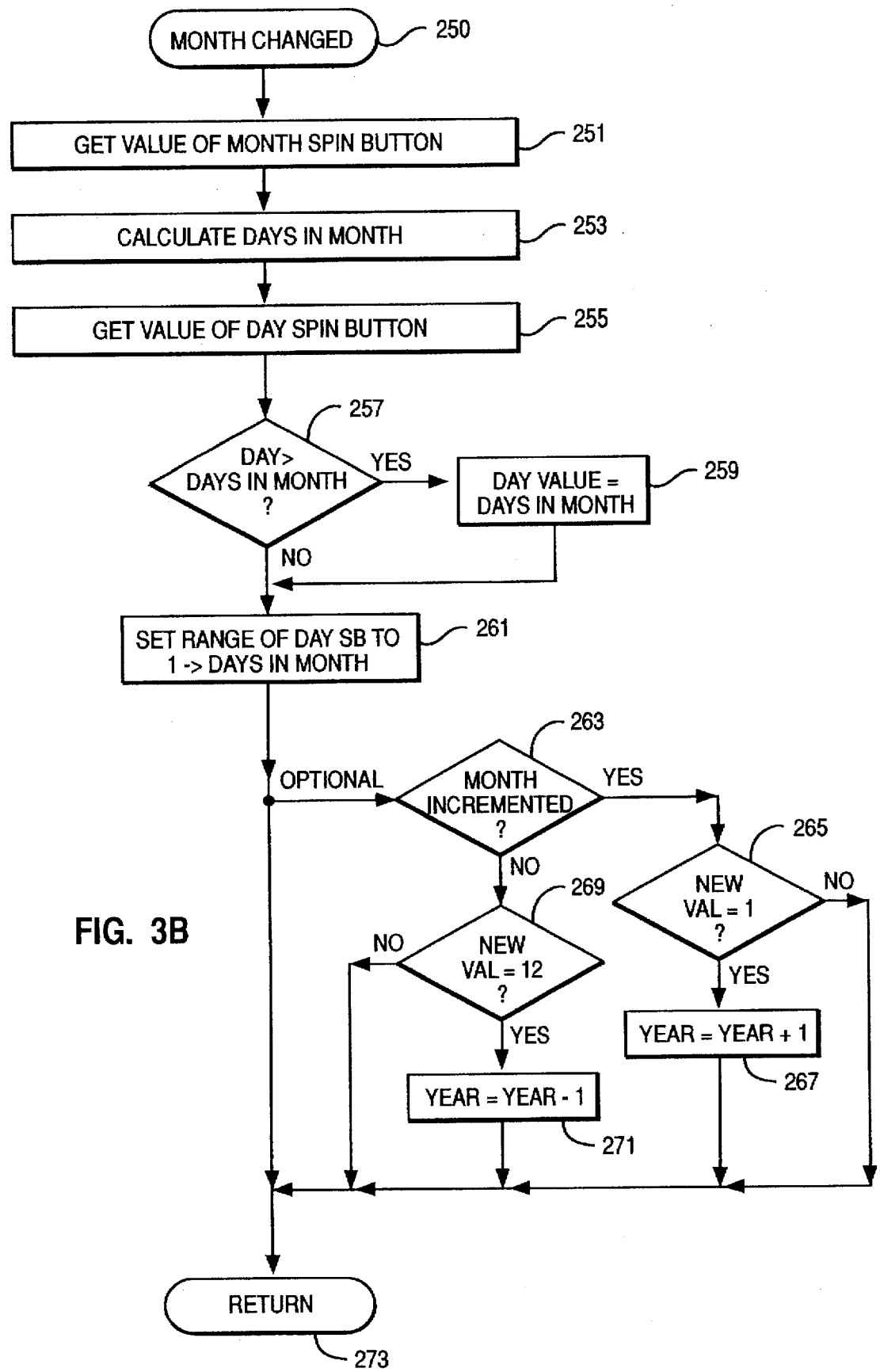

FIG. 3B illustrates the MonthChanged method. After invocation, step 250, the current value of the month spin-button is determined, step 251. In the preferred embodiment, the spin button class has a method which will return its current value. Next, in step 253, the number of days in the current month must be obtained. The preferred embodiment makes use of a method for calculating this which is provided by a class, IDate, included in IBM Open Class. The method, daysInMonth, returns the number of days in a given month, in a given year. This method accurately accounts for leap years, as well. In the absence of this method, one skilled in the art can provide a similar method using a method similar to that detailed in FIG. 3D.

Once the number of days in the month is determined, the value of the day spin button must be obtained in step 255. In the object oriented preferred embodiment, each spin button should have a method which returns its current value. In step 257, a test is performed to determine if the value of the day spin button is now greater than the number of days in the current month. If so, in step 259, the value of the day spin button is set to the number of days in the current month. In step 261, the range of values that the day spin button can now accept is set from 1 to the number of days in the current month. In the preferred embodiment, the spin button should provide a method for setting its range of values. Thus, the user is prevented from spinning the control to a day value that is invalid.

The process flow continues to step 263, for further processing such that the year value can be adjusted in response to certain user changes in the month. A test in step 263, determines if the month spin button is incremented. If so, and the new value equals 1, in the test in step 265, the year is incremented by 1 in step 267. If the month spin button is decremented, and the new value equals 12 in the test in step 269, the year is decremented year by 1 in step 271. The processing in steps 263–271 have allowed the user to "flip" through dates by scrolling the month value. Alternatively, such processing may be omitted, in which case changes to the month would have no effect on the value of the year spin button. The process returns, step 273.

Figure 3C:
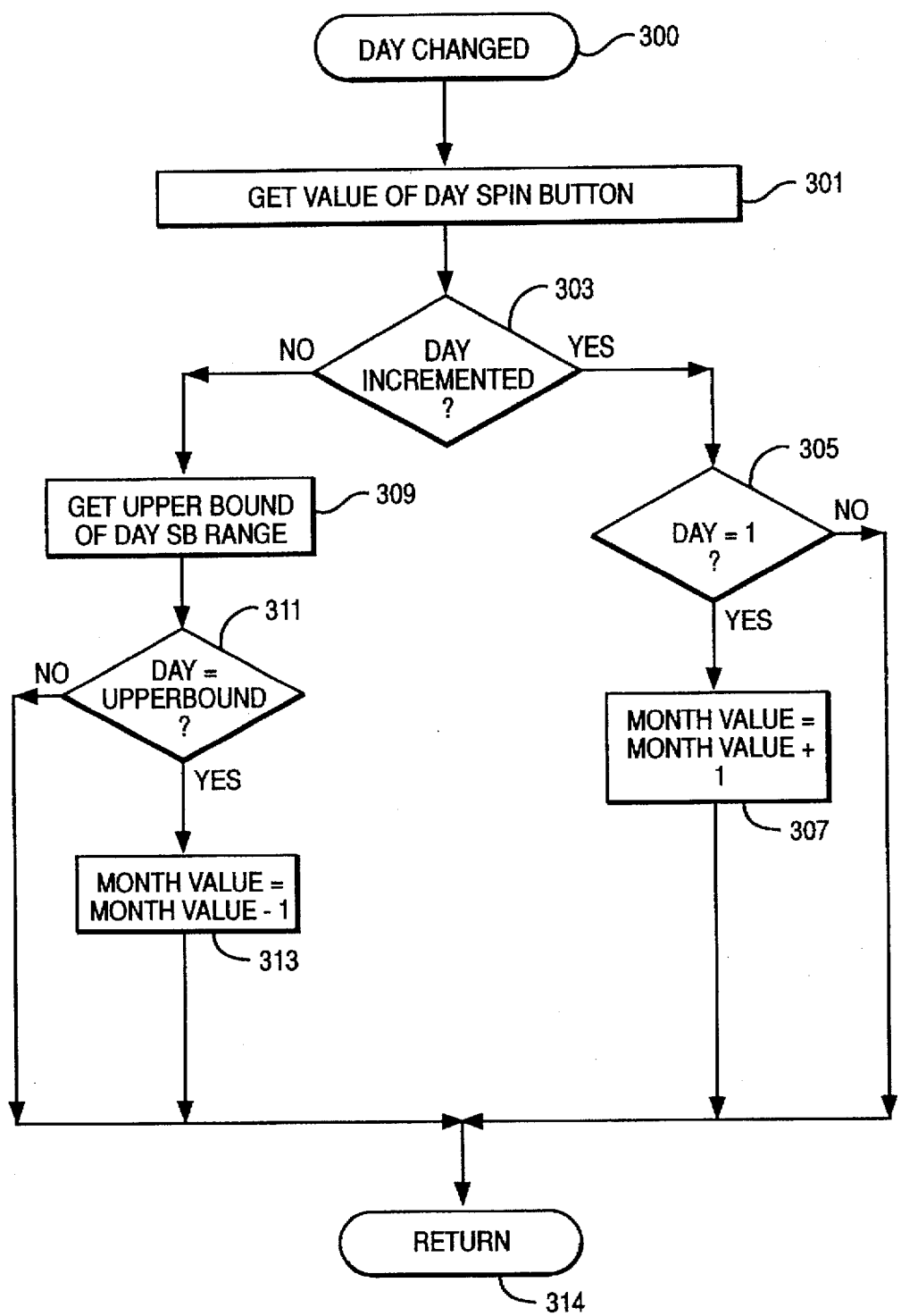

In addition to monitoring the control for month changes, the control can be monitored for changes to the day spin button as well. This processing is optional since, as detailed above, the range of valid values for the day spin button is adjusted every time that the month spin button is changed, which ensures its validity. However, just as the year can be adjusted for certain month changes, so too can the month value be adjusted for certain day changes. As illustrated in FIG. 3C, if the day spin button is changed, a new method can be invoked, DayChanged.

After invocation, step 300, the value of the day spin button is determined in step 301. A test in step 303 determines if the day spin button is incremented. If so, and the test in step 305 determines that the new value equals 1, step 307 increments the month spin button by 1. If the day spin button is decremented, step 309 obtains the upper bound of the day spin button range. As discussed above, the spin button object should preferably provide a method for obtaining the upper bound of its range. If the test in step 311 determines that the value of the day spin button equals the upper bound of its range, step 313 decrements the value of the month spin button by 1. The DayChanged method ends in step 314. The DayChanged method allows the user to "flip" through dates by scrolling the value of the day spin button. Ideally, this would be implemented in conjunction with the optional year adjustment for month changes described above.

Figure 3D:
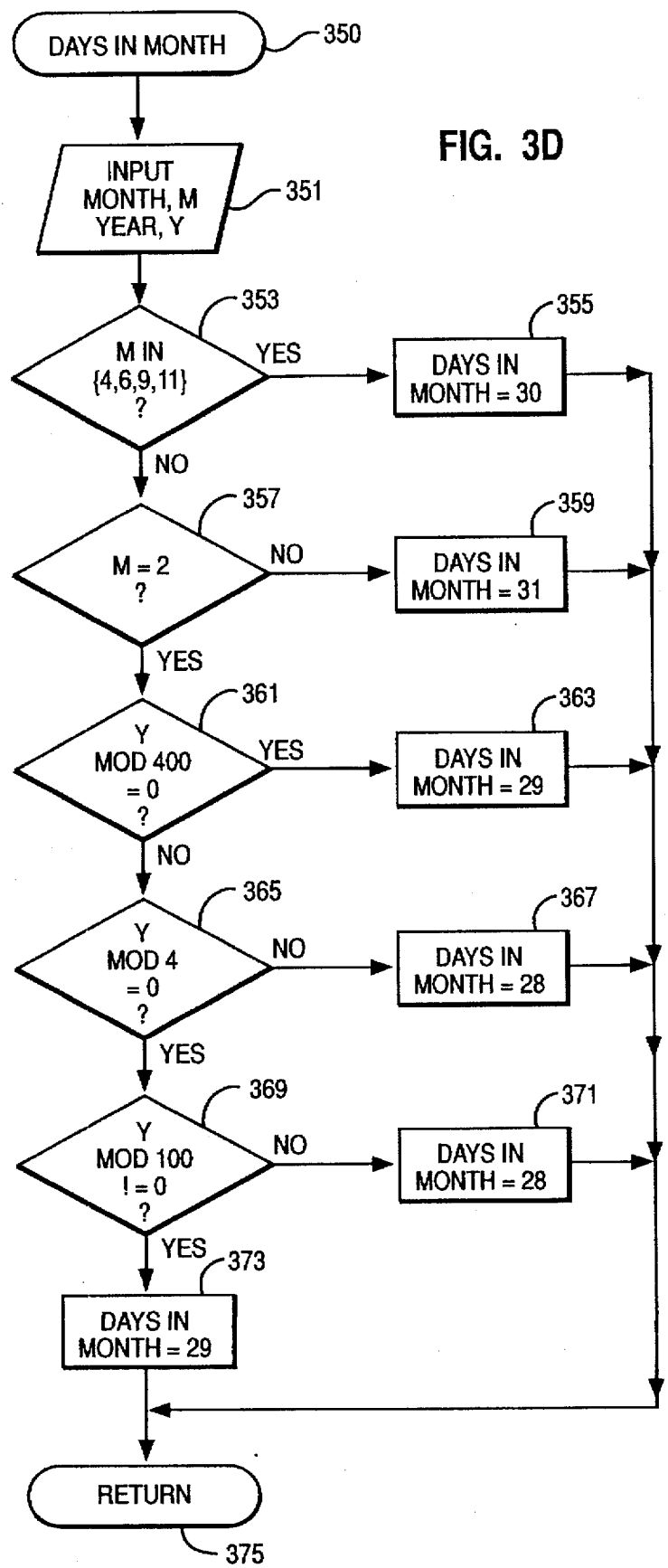

FIG. 3D is a flow diagram of a method for determining the number of days in the month. The process begins with invocation step 350. In step 351, the value of a month, M and a year, Y, is input. Step 353 determines if the value of M is equal any of the following values: 4, 6, 9, 11. If so, in step 355, the number of days in the month is set to 30. If not, step 357 determines whether the value of M equals 2. If not, step 359 sets the number of days in the month to 31. However, if the value of M equals 2, more analysis is necessary. If the remainder of Y when divided by 400 is 0, step 361, then the number of days in the month is set to 29, step 363. If not the test in step 365 determines if the remainder of Y when divided by 4 is equal to 0. If not, in step 367, the number of days in the month is set to 28. Otherwise, the test in step 369 finds if the remainder of Y when divided by 100 is 0. If not, then step 371 sets the number of days in the month is 28. If so, the number of days in the month is 29. In step 375, the number of days in the month is returned to the owning process.

The time control does not require the same type of interaction among the spin buttons as the date control. Therefore, although spin handlers could be used between the spin buttons which compose the time control, in the preferred embodiment, they were not used for the time control.

Internationalization

One of the objects of the invention is to provide support for internationalization and country specific locale information. To successfully sell software in an international market, it is necessary to provide software to the user in the language of their choice. In the preferred embodiment, the time and date controls satisfy this requirement by allowing all text labels to be set, i.e. translated, externally to the controls. The individual components of the date and time controls, the spin buttons will also order themselves according to the conventions of the particular locale selected, lined up with its corresponding translated label.

Two methods are provided for setting the labels of the time and date controls. One method uses a set of functions which are defined to accept character strings and which are to be used programmatically. When using these functions, the application developer is responsible for locating and providing the character strings. The second method utilizes a second set of functions which are defined to accept instances, i.e. objects, of the IResourceId Class of the User interface Class Library. Instances of the IResourceId class allow text strings to be indexed by a resource id from a resource file that exists external to the application code. The resource file typically contains all of the translatable text of an application. A different resource file usually exists for each language supported by the application. The instance of IResourceId identifies both the resource id of the character string and the resource file in which it located. Functions of the IResourceId instance perform the reading of the string from the file. Finally, if no labels are provided by the application developer, the date and time control defaults to English labels for the spin buttons.

In the preferred embodiment, the IResourceId Class retrieves country specific data according to the XPG/4 Internationalization APIs. The XPG/4 APIs provide date and time formatting information based on country and language specific locale information. Those skilled in the art would recognize that other databases and means could provide country specific information. For example, the use of country codes for a specific version of an application is one alternative.

Many operating systems provide limited internationalization capabilities. For example, OS/2 provides such capabilities based on country code page or keyboard parameters defined in the CONFIG. SYS file or CONFIG. INI files. In OS/2, these parameters are used for all applications running on the OS/2 workstation. To change country specific data, a system reboot is required. While this level of support is adequate for many US users who rarely, if ever, change the country data on their workstation, it is not adequate in certain Europe and Asian markets where the user may wish to change the parameters for different programs easily and quickly as the system is running. Thus, some embodiments of the invention allow user input to change the order, format and labels of the controls. Application developers would prefer that only a single version of their application be written rather than writing a separate version for each country. It is also desirable that new countries and keyboard layouts may be added to the system as the application program gains in popularity in new countries. The XPG/4 internationalization model consists of a set of APIs, commands and Locale.dlls. IBM has written a tool kit for OS/2 which it has made available to application developers. XPG/4 support is also found in IBM's AIX operating system.

The XPG/4 model is based on Locales, wherein the world is divided into a collection of Locales. A given country may have one or more Locales assigned to it depending upon its cultural diversity. A Locale is comprised of a combination of language and monetary, time and character sorting conventions for a particular country. For example, Switzerland has German, Italian and French Locales. All of the Swiss locales support the same country, date, time and monetary standards, but each has distinct and cultural conventions for alphabet sorting and messages.

Locale names can be specified in a command for example, set LANG=xx_yy.zzzz, wherein xx is a language abbreviation, yy is a country abbreviation and .zzzz is an optional three or four digit code page number. To set the Locale to US English one might type: set LANG=EN_US. 437. Those skilled in the art would realize that other formats and nicknames might be used to set the Locale variable. The actual Locale information may be stored in dynamic link libraries or other suitable data structures.

Also included in the developer tool kit are include files, libraries.dlls and programs necessary for using the XPG/4 in an application program.

An international program generally changes a default Locale for a Locale set by the user by a call to SET LOCALE which determines the programs Locale by the LAN environment variable or a call overriding whose specific environmental variables or messages monetary formatting, date and time formatting and so forth.

The XPG/4 library comes in two parts, an import library which is linked to the application and a dynamic link library which is placed in the runtime machines bypath.

National language support is described in the XPG/4 CAE specification which is a publication of the X/Open Company Ltd.

The country specific information, if available on a given system, is queried by the time and date controls through the use of the XPG/4 APIs. One of the APIs provided with XPG/4 support, nl_langinfo, returns data pertaining to the language aspects of the locale. In this case, the date format can be determined by calling the nl_langinfo API with the D_FMT parameter. This returns a character string in the format correct for the current locale, for example mm/dd/yy, dd/mm/yy, or yy/mm/dd. The time cmode of 24 verses 12 hour format can also be obtained from the nl_langinfo API by calling it with the AM_STR or PM_STR parameters. In this case a null character string returned dictates a 24 hour time format, otherwise the format is 12 hour. In response to this information, the controls may be modified as follows:

Date Order: The Date Control can display the date in the Month, Day, Year format, the Day, Month, Year format, or the Year, Month, Day format. The order of spinbuttons is set by manipulating the column in which a position value for each spin button object appears in a table kept by the parent multicellcanvas object. For example, if the date format as indicated by the locale is the Month, Day, Year format, the month spin button and its corresponding text label are added to the multicellcanvas in the leftmost column, next followed by the day spin button and its label in the next column, finally followed by the year spin button and its label. The spin button objects are therefore added to the multicellcanvas object in whatever order is correct for the locale.

Figure 4:
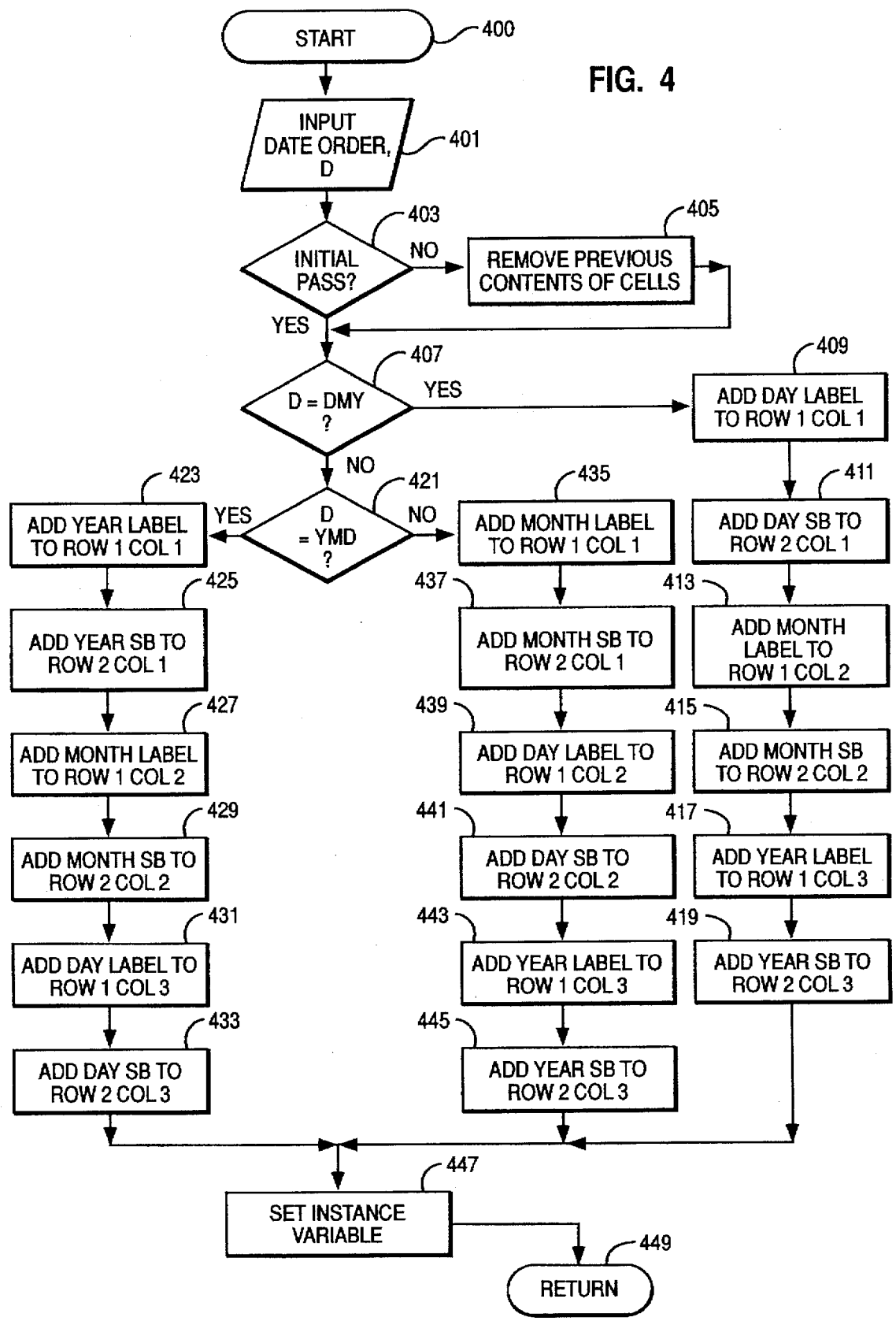
FIG. 4 is a flow diagram showing how the date control is reordered according to the appropriate local.

The Date order process is depicted in FIG. 4 and discussed in greater detail immediately below.

The process begins in step 400. In step 401, the date order, D, is input to the process. Given a desired date order, D, as input two tests, steps 407 and 421, are performed to determine the branch of the process to use. Logically, the date order can consist of one of three values:

1. Day, Month, Year (DMY)
2. Year, Month, Day (YMD)
3. Month, Day, Year (MDY)

First, however, step 403 determines if this is the initial pass through this processing. If it is not, step 405 removes the previous contents of all the cells of the multicellcanvas so that new values can be placed in them. The row and column characteristics of the multicellcanvas allow the control to change the date order efficiently. However, while one skilled in the art can appreciate the benefits of having such a tabular canvas for this purpose, other alternatives such as creation of a multidimensional array structure would be possible.

Next, step 407 tests if the date order, D, equals DMY. If so, then steps 409–419 are performed. In step 409, the text label corresponding to the day spin button to the cell that resides in row 1, column 1 of the canvas is added to the control. In step 411, the day spin button to the cell that resides in row 2, column 1 of the canvas is added. The text label corresponding to the month spin button to the cell that resides in row 1, column 2 of the canvas is added in step 413. The month spin button to the cell which resides in row 2, column 2 of the canvas is added in step 415. Step 417 adds the text label corresponding to the year spin button to the cell that resides in row 1, column 3 of the canvas. Step 419 adds the year spin button to the cell that resides in row 2, column 3 of the canvas. The labels are retrieved from instance data stored in the class at initialization of the control.

However, if the date order does not equal DMY, the test in step 421 determines if date order, D, equals YMD. If so, then steps 423–433 are performed. Step 423 adds the text label corresponding,to the year spin button to the cell that resides in row 1, column 1 of the canvas. The year spin button to the cell that resides in row 2, column 1 of the canvas is added in step 425. In step 427, the text label corresponding to the month spin button to the cell that resides in row 1, column 2 of the canvas. Step 429 adds the month spin button to the cell which resides in row 2, column 2 of the canvas. The text label corresponding to the day spin button to the cell that resides in row 1, column 3 of the canvas is added in step 431. In step 433, the day spin button to the cell that resides in row 2, column 3 of the canvas is added.

If the date order is not DMY or YMD, the process defaults to MDY processing. In step 435, the text label corresponding to the month spin button to the cell that resides in row 1, column 1 of the canvas is added. Step 437 add the month spin button to the cell which resides in row 2, column 1 of the canvas. The text label corresponding to the day spin button to the cell that resides in row 1, column 2 of the canvas is added in step 439. The day spin button to the cell which resides in row 2, column 2 of the canvas is added in step 441. Step 443 adds the text label corresponding to the year spin button to the cell that resides in row 1 column 3 of the canvas. In step 445, the year spin button to the cell that resides in row 2, column 3 of the canvas is added.

Once the day order is set in the canvas, step 447 sets an instance variable to indicate the current date order, for example, usDateOrder=0 (this would indicate MDY format)
usDateOrder=1 (this would indicate DMY format)
usDateOrder=2 (this would indicate YMD format).

The process returns, step 449.

In addition, a method can be invoked to set the date order independently of the locale by using the public interfaces of the preferred embodiment described below.

Time Mode: The time control can display the time in 24 or 12 hour format. Similar to the date format above, the time mode can be dictated by the locale, or set independently. For the 24 hour format, the range of valid entries to the hour spin button is set to 0–23. The time control object is set to consist of three spinbuttons with no radio buttons. For the 12 hour format, the range of the hour spin button is set to 1–12. As shown above, the preferred embodiment of the time control comprises three spin buttons and two radio buttons for AM and PM.

An existing class object, such as the ITime class of the User Interface Class Library can be used as the time construct for retrieving and setting the value of the time control programmatically. Alternatively, the function can be built into the time control object itself. One skilled in the art could likewise provide a similar construct which consists of a common programming structure having three unsigned short integer values which together represent a time value. For the 24 hour format, the output of the ITime class can be used without manipulation. However, for the 12 hour format, further processing is necessary since the ITime class stores data in 24 hour format.

Figure 5:
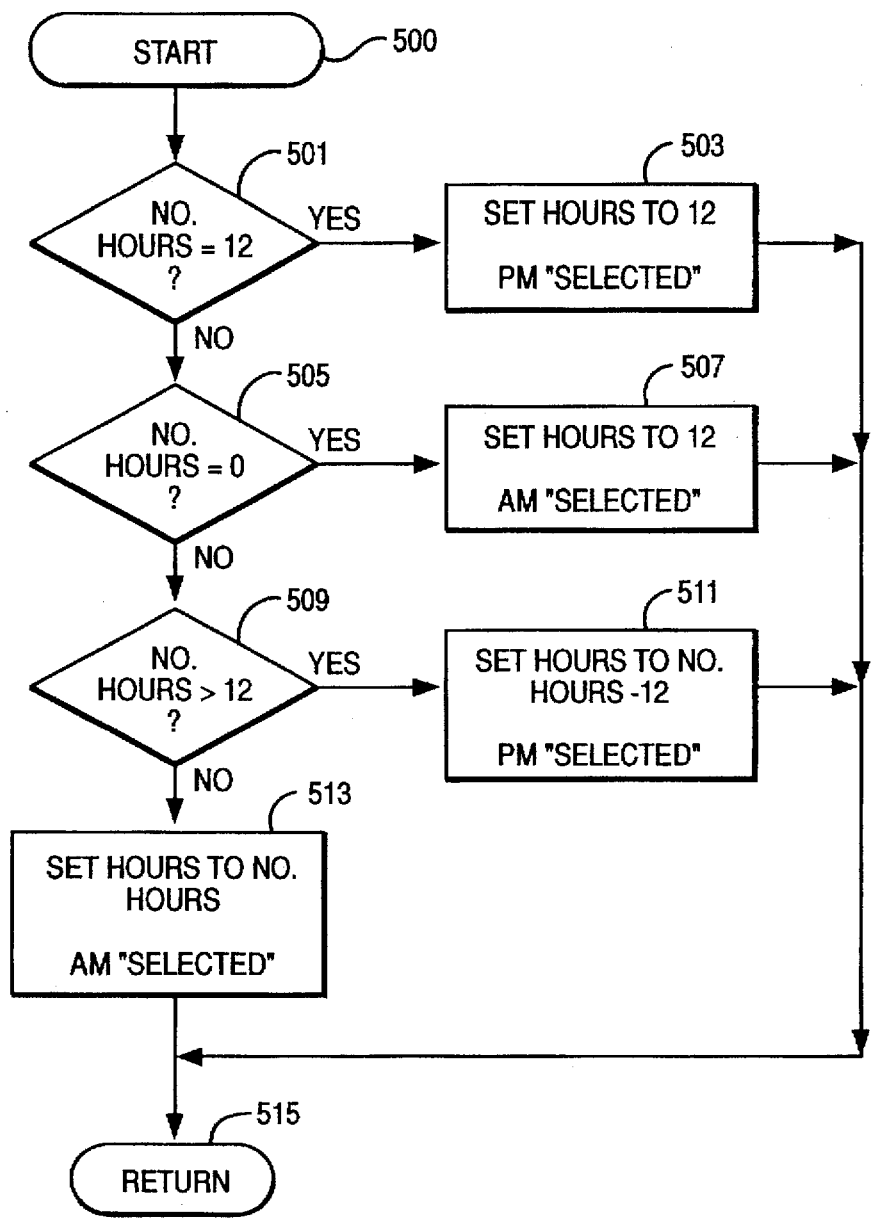
FIG. 5 is a flow diagram of setting the time control.

The process for setting the time control object in 12 hour format programmatically given time in 24 hour format is depicted in FIG. 5. After initiating the process, step 500, in step 501, a test is performed to determine whether the number of hours in the ITime construct is equal to 12. If so, in step 503, set the hours spin button to 12, and set the PM radiobutton to be "selected". If the number of hours in the ITime construct is not equal to 12, in step 505, a test is performed to determine if the number of hours in the ITime construct is equal to 0. If so, in step 507, the hours spin button is set to 12, and the AM radiobutton is set to "selected".

If the test in step 505 fails, then a test in step 509 determines if the number of hours in the ITime construct is greater than 12. If so, in step 511 set the hours spin button to the number of hours minus 12, and set the PM radiobutton to be "selected". If the test in step 509 fails, i.e. the number of hours is less than 12, in step 513 set the hours spin button to the number of hours in the ITime construct, and set the AM radiobutton to be "selected".

The process for retrieving the time from the time control programmatically is basically the reverse of the process of querying the value of the Hours Spinbutton and the radio buttons for conversion into the 24 hour format acceptable to the ITime construct. The process (not illustrated) is as follows: First, the value from the minutes spin button is retrieved. Next, the value from the seconds spin button is determined. Next, the value from the hours spin button is retrieved. As discussed above, each spin button should have a method for returning its current value. Next, the current time mode (24 versus 12) is determined by querying the value of an instance variable created for this purpose. If the time mode is 24 hour format, the value of the hours spin button is already in the correct format so no special processing is necessary.

However, if the time mode is 12 hour format, the following process is performed. If the value of the hours spin button equals 12, and the AM radio button is selected, then the equivalent number of hours in 24 hour format is equal to 0. Otherwise, if the value of the hours spin button equals 12, and the PM radio button is selected, then the equivalent number of hours in 24 hour format is equal to 12. Otherwise, if the value of the hours spin button does not equal 12, and the PM radio button is selected, then the equivalent number of hours in 24 hour format is equal to the value of the hours spin button plus 12. Otherwise, if the value of the hours spin button does not equal 12, and the AM radio button is selected, then the equivalent number of hours in 24 hour format is equal to the value of the hours spin button. Finally, the ITime construct, or a similar structure, can be set with the correct number of hours, minutes, and seconds in 24 hour format, regardless of the current format of the time control.

Other public interfaces of the time control class object, as shown in greater detail below, include the ability to programmatically set the control to any valid time, the ability to retrieve the current value of the time from the control, the ability to format the value of the time into a culturally correct string, and the ability to enable and disable the control as a single entity.

Event Notification

Another unique feature of the date and time controls of the present invention is the ability to send notification that a change occurred from the control to its owner window or application. Through the use of the Open Class Library handler functions, a handler class has been implemented which applications can use if they wish to be notified when the new event, UIFW_DT_CHANGED, has occurred. This gives the application the opportunity to perform special processing based on this event, such as querying and saving data. Others might include saving the new values to disk or sending them to other applications. Yet another example of special processing would be for other GUI controls to update their values automatically based on changes to the date and time control. For example, the application might update the time control in response to changes in the date control.

Event processing by the date and time controls is unique because it is generated from the control itself, rather than the individual components of the control, such as the spin buttons. For example, when a user increments a spin button to change the time, and the application wishes to be notified, an event will be generated indicating that a time change has occurred. Without this handler, the application would have to listen for events directly from each spin button and then determine which control contained the spin button.

Figure 6:
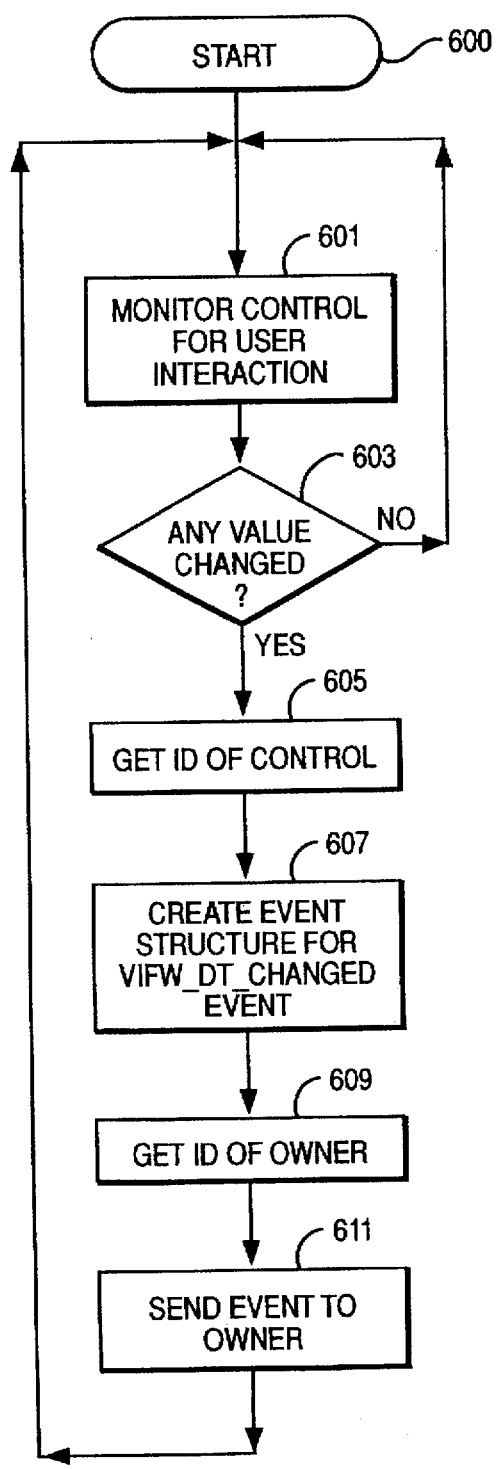
FIG. 6 is a flow diagram of a notification of a change to the control to the owner so that special processing may occur.

Communication among the GUI components of the controls can be implemented as a series of messages which are sent to and from controls and windows within the GUI to signify that various events are taking place. In the preferred embodiment, the fact that the value of either the date or time control has changed is an event of which the owning window of the control should be notified. The process by which the control issues the event notification is depicted in FIG. 6 and described below.

After initiating the notification process, step 600, the control is monitored for user interaction by means of an edit handler which is attached to the control during control initialization, step 601. In the preferred embodiment, the edit handler can be constructed by subclassing a general purpose edit handler class contained in IBM Open Class called IEditHandler. The purpose of such a class is to listen for edit events of a given control and invoke a method, the edit method, when such an event occurs. In the preferred embodiment of this invention, the edit method was overridden in the subclass to process these individual edit events. The "edit events" in the date and time controls are any changes to the individual spin buttons of the controls.

If any change within the control occurs, step 603, the edit method is invoked, and the following processing occurs. In step 605, the control identifier is obtained from the control. As mentioned previously, all controls, date and time included, are assigned an arbitrary control identifier at the time the control is constructed. In step 607, the event structure for the new event is created. This event structure consists of the identifier of the control that is sending the event, the event name, in this case UIFW_DT_CHANGED, and the window handle of the control that is sending the event. In step 609, a pointer to the owner of the control is obtained. In the preferred embodiment, a method is provided by an ancestor class, IWindow, which is available to the controls and provides this information. In step 611, the event is sent to the owner window. In the preferred embodiment, this is accomplished by means of another method provided by the ancestor class IWindow, sendEvent. This method takes as its input the event structure to be sent, and relies on the underlying presentation layer to send the event as a message to the receiver object, in this case the owner window. Presentation layers, such as Presentation Manager in OS/2, commonly coordinate communication among its windows through messages. Those skilled in the art would readily appreciate that alternative massaging mechanisms can be used.

In the preferred embodiment, the time control in 12 hour format requires an additional handler to monitor the selection of the radio buttons. This handler is similar to the edit handler, except that it is derived from the ISelectHandler class of the IBM Open Class library, and monitors "select" events instead of "edit" events. One skilled in the art would recognize that other controls which rely on selection events rather than edit events would perform similarly.

The result is that the date or time control issues an event notification to its owner whenever a change occurs within it. Furthermore, this event notification references the id of the control itself, instead of an individual object within the control.

The section above describes how the control issues the event notification. A section below describes how an application can use the new handler class, UIFWDateTimeHandler, to listen for notification of this new event.

Enabling and Disabling the Controls

At times, it is necessary for a GUI control to be disabled so that the user is unable to interact with the control at that time. Perhaps the user is not authorized to change the field or the data contained within the field is not applicable, given the current values of other fields in the GUI. A disabled field also should be visually "grayed out" so that the user is aware of its disabled status. It is thus important that a control has the ability to be disabled and correspondingly enabled.

In the preferred embodiment, as child objects of the IMultiCellCanvas class, the date and time controls have access to methods provided not only by their immediate parent objects, but also by all their previous ancestor objects at higher levels in the object hierarchy. Two methods, enable() and disable() were available from a more generic parent object, IWindow. The IWindow class is the parent of many classes in the User Interface Class Library and as such provides some basic functionality to all control objects beneath it in the object hierarchy. Since spin buttons and text fields are both children of IWindow in the preferred embodiment, these objects inherit some basic methods to be enabled and disabled. However, in the new date and time controls, to respond appropriately to being enabled or disabled it was necessary to override the generic disable() and enable() methods inherited by the controls. In C++, a method inherited from a parent can be overridden by declaring the method in the class definition. The application can then provide new functionality with will take precedence over the method of the same name provided by the parent. For example, in the disable() method of the date control, the month, day, and year spin buttons are each sent the message to disable themselves. The same is true for the corresponding text labels. The result is that the entire date control is disabled as a single entity.

Figure 7:
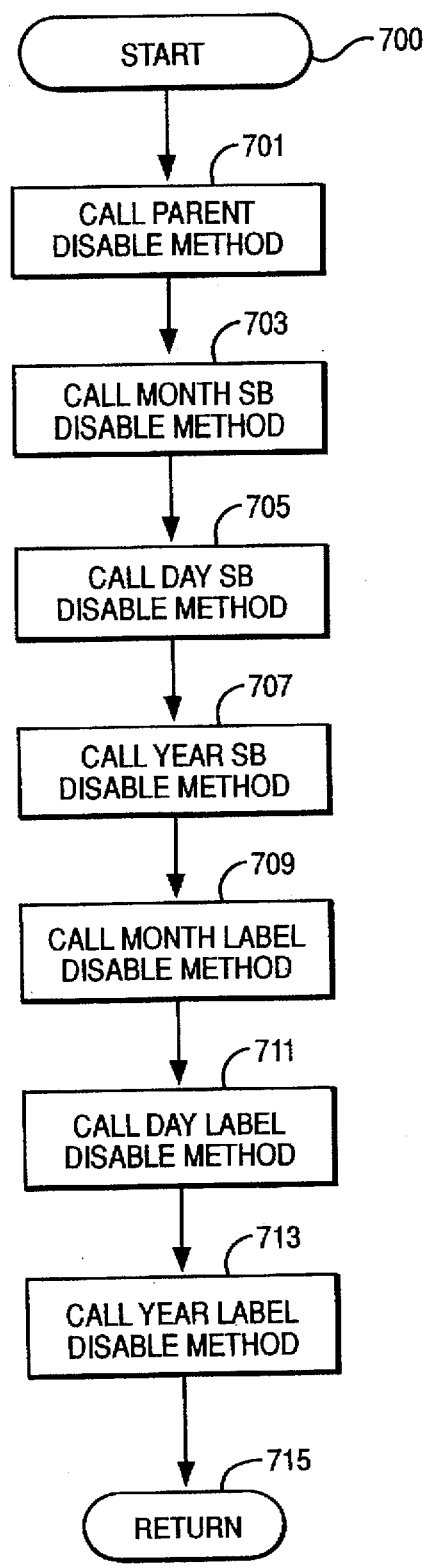
FIG. 7 depicts enabling and disabling the date or time control as a separate entity.

The process of disabling the Date control as a single entity is depicted in FIG. 7. After invocation of the method in step 700, in Step 701, the parent disable() method is called. It is common to call the parent method when overridding methods to take advantage of an processing the parent method does. In this case, calling the parent method serves to disable the multicellcanvas that comprises the date control. All components of the date control are descendents of the IWindow class and have overridden disable() methods of their own. This means that each spin button and each text label has access to its own disable() method.

In the steps 703–713 the disable() method is in turn called on each component of the control as follows: In Step 703, the disable() method is called for the Month spin button. This grays out and otherwise disables, i.e. disallows user input or other changes, the Month spin button. In Step 705, the disable() method is called for the Day spin button. This grays out the otherwise disables the Day spin button. In step 707, the disable() method is called for the Year spin button. This grays out and otherwise disables the Year spin button. In Step 709, the disable() method is called for the Month text label. This grays out and otherwise disables the Month text label. In Step 711, the disable() method is called for the Day text label. This grays out and otherwise disables the Day text label. In Step 713, the disable() method is called for the Year text label. This grays out and otherwise disables the Year text label. The process ends, step 715.

The result is that the entire date control appears grayed out and does not respond to user interaction. Those skilled in the art would understand that the enable method is similar.

Portability Across Platforms

As mentioned above, one of the objects of the inventions was to promote portability across multiple platforms. In the preferred embodiment, the IBM User Interface Class Library was chosen as the development class structure because its classes are designed to be platform independent. Currently, this class library is in use in both the OS/2 and AIX environments. In addition to using this portable development tool, care was taken to not introduce any platform specific code into the date and time controls. The result is a pair of controls that can be used in any environment that supports the Open Class Library. Those skilled in the art would readily comprehend that other class libraries could be used as a basis for the time and date controls such as Zapp Portable C++ Application Framework from Inmark Development Corp., Zinc Application Framework from Zinc Software Inc., and C++ Libraries for Containers and More from Rogue Wave Software, Inc.

Interfaces for Programmatic Setting of Controls

As mentioned above, one feature of the invention is to allow the user to programmatically set the control to any valid date, retrieve the current date and format i.e order, the current date through a public interface. One preferred embodiment of the public interfaces of date control C++ class is shown below.

```
public:
   UIFWDateControl (unisgned long uTId,
           IWindow *piwParent,
                    IWindow *piwOwner);
   UIFWDateControl
   &setDate(const IDate& idDefault);
   UIFWDateControl &setFieldLabels(const IResourceId& iriMonthLabel,
                    const IResourceId& iriDayLabel,
               const IResourceId& iriYearLabel);
   UIFWDateControl &setFieldLabels(const char
   *pszMonthLabel="Month",
                    const char *pszDayLabel="Day",
               const char *pszYearLabel="year");
   IDate
   getDate() const;
   IString
   getDateAsString() const;
   unsigned short getDateOrder() const;
   UIFWDateControl &setDateOrder(unsigned short usOrder);
   IMultiCellCanvas & enable(Boolean enableWindow =true);
   IMultiCellCanvas &disable();
```

In the preferred embodiment, the interfaces of the date control can be used in several ways. In the application, an instance of the date control would be created by invoking the class constructor UIFWDateControl. This constructor requires that an arbitrary identifier be supplied, as well as pointers to the parent and owner windows.

A default value of the date control could be set in the application by invoking the setDate method on the new instance. For convenience in the preferred environment, the setDate method takes as its input an instance of the IDate class. The IDate class is provided by IBM Open Class as a means of organizing date data into a convenient structure. However, one skilled in the art could create a similar data structure which consists of three unsigned short integers which represent the month, day, and year values of a date. The setDate method updates the value of each spin button to reflect the date desired. Additionally, the range of the day spin button is set based on what is valid for the month.

The application overrides the default date order dictated by available locale information and instead sets the date order arbitrarily. An override could be accomplished by invoking the setDateOrder method on the date control instance. The setDateOrder method takes as input an unsigned short integer with the following meaning. A value of 0 indicates that the date order should be set to Month, Day, Year. A value of 1 indicates that the date order should be set to Day, Month, Year. A value of 2 indicates that the date order should be set to Year, Month, Day. Any other value defaults to Month, Day, Year.

After some amount of user interaction, the application can retrieve the current value of the date control. It is necessary to retrieve the current value of the date control to store the value in a database or use the value as input to some other processing, for example. A GUI used for tracking records, for example, may need to store the date of documents in a database. To retrieve the current value, the getDate method would be invoked on the date control instance. The getDate method in turn retrieves the values from each of the spin buttons via methods that each spin button should provide. For convenience sake, the getDate method returns the current value of the control as an instance of the IDate class, however, as mentioned above, another structure can easily be used.

The application may also retrieve the value of the date control as a character string. The getDateAsString method can be used for this purpose. The getDateAsString method is invoked on the date control instance. This method makes use of the getDate method to retrieve the date value from the control as an IDate construct and then converts it to a character string before it is returned to the application. The format of the string is determined by country specific locale information if available, or defaults to the format mm/dd/yy.

The application may also temporarily disable or enable the date control. This is accomplished by invoking the enable or disable method on the date control instance. The disable method has the effect of visually "graying" all of the objects which together make up the date control. These include each of the three spin buttons and their corresponding text labels. In addition to being visually grayed, the control is made inoperable, and therefore does not respond to user interaction. The enable method has the effect of "ungraying" these objects and otherwise making the control operable again.

As discussed above, the preferred embodiment of the invention provides a public interface for the time control to set the control to any valid time, retrieve the time value from the control, format the value of the time control to a culturally correct string and enable or disable the time control. One preferred embodiment of the public interfaces of this new time control class is shown below.

```
public:
   UIFWTimeControl ( unisnged long uIId,
           IWindow *piwParent,
                    IWindow *piwOwner);
   UIFWTimeControl
   &setTime(const ITime& itDefault);
   UIFWTimeControl &setFieldLabels(const IResourceId& iriHoursLabel,
           const IResourceId& iriMinutesLabel,
           const IResourceId& iriSecondsLabel);
   UIFWTimeControl &setFieldLabels(const char *pszHoursLabel=Hours",
               const char *pszMinutesLabel="Minutes",
           const char *pszSecondsLabel="Seconds");
   UIFWTimeControl &setAMPMStrings (const IResourceId& iriAMString,
           const IResourceId& iriPMString);
   UIFWTimeControl &setAMPMStrings (const char *pszAMString="AM",
           const char *pszPMString+"PM");
   ITime
      getTime() const;
   IString
      getTimeAsString() const;
   UIFWTimeControl &setTimeMode(unsigned short usMode);
   IMultiCellCanvas &enable(Boolean enableWindow = true);
   IMultiCellCanvas &disable();
```

In the preferred embodiment, an application could use the interfaces of the time control in the following ways. First, as above, an instance of the time control is created by invoking the class constructor UIFWTimeControl. The application could set the default value of the time control by invoking the setTime method on the new instance. For convenience in the preferred environment, the setTime method takes as its input an instance of the ITime class. The ITime class is provided by IBM Open Class as a means of organizing time data into a convenient structure. However, one skilled in the art could create a similar data structure which consists of three unsigned short integers which represent the hours, minutes, and seconds values of a time. The setTime method updates the value of each spin button to reflect the time desired, and if the time control is in 12 hour format, it selects the appropriate radio button as well. The time control could be used as an applciation clock, for example, wherein the time is reset periodically.

The application may override the default time mode dictated by available locale information and instead set the time mode arbitrarily. The application could do so by invoking the setTimeMode method on the time control instance. The setTimeMode method takes as input an unsigned short integer with the following meaning. A value of 0 indicates that the time mode should be set to 24 hour format. A value of 1 indicates that the time mode should be set to 12 hour format. Any other value defaults to 24 hour format.

After some amount of user interaction, the application may retrieve the current value of the time control. To do so, the getTime method on the time control instance would be invoked. This in turn retrieves the values from each of the spin buttons via methods that each spin button should provide, and if the time control is in 12 hour format, it queries the value of the radio buttons to return the appropriate time value. For convenience sake, the getTime method returns the current value of the control as an instance of the ITime class, however, as mentioned above, another structure can easily be used.

The application may also retrieve the value of the time control as a character string. The getTimeAsString method can be used for this purpose. This method is invoked on the time control instance. This method makes use of the getTime method to retrieve the time value from the control as an ITime construct and then converts it to a character string before it is returned to the programmer. The format of the string is determined by country specific locale information if available, or defaults to the format hh:mm:ss.

The application may temporarily disable or enable the time control. This is accomplished by invoking the enable or disable method on the time control instance. The disable method has the effect of visually "graying" all of the objects which together make up the time control. These include each of the three spin buttons, their corresponding text labels, and if the control is in 12 hour format, radio buttons. In addition to being visually grayed, the control is made inoperable, and therefore does not respond to user interaction.

As discussed above, a handler class has been derived which allows the date and time controls to send events to their owning windows. One preferred embodiment for the definition of this new handler C++ class is shown below:

```
class_Export UIFWDateTimHandler: public IHandler
{
  friend class UIFWDateControl;
  friend class UIFWTimeControl;
  public:
    UIFWDateTimeHandler();      /// Constructor
    UIFWDateTimeHandler();      /// Destructor
  protected:
    #define UIFW_DT_CHANGED 1500
    Boolean dispatchHandlerEvent( IEvent & evt );
    virtual Boolean changed(IControlEvent &iceCtlEvent);
};/// end class UIFWDateTimeHandler
```

In the preferred embodiment, the new handler class, UIFWDateTimeHandler, is derived from a generic handler class, IHandler, included in IBM Open Class. An application which listens for the new event, UIFW_DT_CHANGED, would have a subclassed handler instance using attached to the owner of the control to be monitored, via the handleEventsFor method. The handleEventsFor method is provided by the IHandler class and serves to connect a handler to any object derived from the IWindow class. One of the methods overridden for the current invention is the dispatchHandlerEvent. The overridden method of the UIFWDateTimeHandler class filters all messages looking for the new event, UIFW_DT_CHANGED. When this event is received, another method is invoked to perform any processing that should occur when the event happens.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Further, although numerous references have been made to specific objects and methods and modifications thereof, one skilled in the art would appreciate that other objects and methods could be easily substituted.

Therefore, changes in form and detail may be made therein without departing from the spirit and scope of the invention as set forth in the accompanying claims.

We claim:

1. A method for operating an object oriented control in a graphical user interface of a computer system, wherein the control is composed of plurality of child objects, comprising the steps of:
   determining a value for a first child object in the control;
   setting a range of allowed values in a second child object according to the value for the first child object;
   monitoring the values selected by a user for the second child object;
   responsive to a selection beyond a first end of the allowed range of values for the second child object, selecting a value for the second child object at a second end of the allowed range of values for the second child object; and
   responsive to selecting the value at the second end of the allowed range, changing the value for the first child object.

2. The method as recited in claim 1 wherein the control is a date control and the first child object is for setting a month value and the second child object is for setting a day value.

3. The method as recited in claim 1 further comprises the step of:
   rejecting any selected values outside the range of allowed values for the second child object.

4. The method as recited in claim 2 further comprising the steps of:
   detecting a change in the month value for the first child object;
   determining a new allowed range for the day value of the second child object; and
   determining whether a current day value for the second child object is outside the new allowed range.

5. The method as recited in claim 2 wherein the control further comprises a third child object for setting a year value, and the method further comprises the steps of:
   determining a date order for an application which owns the control; and ordering the first, second and third child objects within the control according to the date order.

6. The method as recited in claim 5 wherein the date order is determined from a locale value for the owning application by accessing a data structure containing locale and corresponding date order data.

7. The method as recited in claim 5 wherein the date order is determined according to a default value for the owning application.

8. The method as recited in claim 1 further comprising the steps of:

detecting a change in the first child object of the control; and notifying an application which owns the control of the detected change with a message comprising an identifier for the control and detected change in the first child object.

9. A system including processor, memory, input device and display for operating an object oriented control in a graphical user interface of a computer system, wherein the control is composed of plurality of child objects, comprising:

means for determining a value for a first child object in the control;

means for setting a range of allowed values in a second child object according to the value for the first child object;

means for monitoring the values selected by a user for the second child object;

means responsive to a selection beyond a first end of the allowed range of values for the second child object for selecting a value for the second child object at a second end of the allowed range of values for the second child object; and means responsive to selecting the value at the second end of the allowed range for changing the value for the first child object.

10. The system as recited in claim 9 wherein the control is a date control and the first child object is for setting a month value and the second child object is for setting a day value.

11. The system as recited in claim 9 further comprises means for rejecting any selected values outside the range of allowed values for the second child object.

12. The system as recited in claim 10 further comprising:

means for detecting a change in the month value for the first child object;

means for determining a new allowed range for the day value of the second child object; and means for determining whether a current day value for the second child object is outside the new allowed range.

13. The system as recited in claim 11 wherein the control further comprises a third child object for setting a year value, and the system further comprises:

means for determining a date order for an application which owns the control; and means for ordering the first, second and third child objects within the control according to the date order.

14. The system as recited in claim 13 wherein the date order is determined from a locale value for the owning application by accessing a data structure containing locale and corresponding date order data.

15. The system as recited in claim 13 wherein the date order is determined according to a default value for the owning application.

16. The system as recited in claim 9 further comprising:

means for detecting a change in the first child object of the control; and means for notifying an application which owns the control of the detected change with a message comprising an identifier for the control and detected change in the first child object.

17. A computer program product in a computer readable memory for operating an object oriented control in a graphical user interface of a computer system, wherein the control is composed of plurality of child objects, comprising:

means for determining a value for a first child object in the control;

means for setting a range of allowed values in a second child object according to the value for the first child object;

means for monitoring the values selected by a user for the second child object;

means responsive to a selection beyond a first end of the allowed range of values for the second child object for selecting a value for the second child object at a second end of the allowed range of values for the second child object; and means responsive to selecting the value at the second end of the allowed range for changing the value for the first child object.

18. The product as recited in claim 17 wherein the control is a date control and the first child object is for setting a month value and the second child object is for setting a day value.

19. The product as recited in claim 17 further comprises means for rejecting any selected values outside the range of allowed values for the second child object.

20. The product as recited in claim 18 further comprising:

means for detecting a change in the month value for the first child object;

means for determining a new allowed range for the day value of the second child object; and means for determining whether a current day value for the second child object is outside the new allowed range.

21. The product as recited in claim 19 wherein the control further comprises a third child object for setting a year value, and the product further comprises:

means for determining a date order for an application which owns the control; and means for ordering the first, second and third child objects within the control according to the date order.

22. The product as recited in claim 21 wherein the date order is determined from a locale value for the owning application by accessing a data structure containing locale and corresponding date order data.

23. The product as recited in claim 21 wherein the date order is determined according to a default value for the owning application.

24. The product as recited in claim 17 further comprising:

means for detecting a change in the first child object of the control; and means for notifying an application which owns the control of the detected change with a message comprising an identifier for the control and detected change in the first child object.

* * * * *